Patented Sept. 7, 1954

2,688,627

UNITED STATES PATENT OFFICE 2,688,627

DICYCLOPENTADIENE CARBOXYLIC ACIDS

Charles A. Cohen, Roselle Park, Louis A. Mikeska, Westfield, and Frederick Knoth, Jr., Sayreville, N. J., assignors to Standard Oil Development Company, a corporation of Delaware No Drawing. Application May 8, 1952, Serial No. 286,834

13 Claims. (Cl. 260—429)

This invention relates to novel dicyclopentadiene carboxylic acids and to a process for producing the same. Specifically, this invention relates to tetrahydrodicyclopentadiene carboxylic acids and process for producing these products.

In the practice of this invention the starting material is substantially pure dicyclopentadiene or a copolymer of methyl cyclopentadiene and cyclopentadiene (hereinafter referred to as methyldicyclopentadiene) or a dimer made from methyl cyclopentadiene (hereinafter referred to as dimethyldicyclopentadiene) or mixtures of two or more of these products normally found in petroleum refinery streams originating from either vapor phase, gas phase, or steam cracking processes. The production of the starting materials and methods of concentrating these dimers is not an intrinsic part of this invention. For most purposes, 60 to 90% alphadicyclopentadiene available commercially will suffice. It is a primary object of this invention to convert the individual or mixed dimers to the tetrahydrocarboxylic acids by a series of reactions involving hydrogenation to the dihydro derivative, ester-oxonation of the dihydro derivative, and hydrolysis or saponification of the ester to the corresponding acid.

The hydrogenation of the dicyclopentadiene or alkyl substituted dicyclopentadiene to the dihydro derivative is effected by means of ordinary hydrogen in the presence of catalysts such as Raney nickel, nickel on kieselguhr or other supporting medium, or noble metal catalysts such as platinum oxide and the like. Temperatures for the hydrogenation may be from ambient temperatures to about 100° C. and pressures may be from one atmosphere to as high as 1000 pounds per square inch pressure. The upper limit expressed is not limiting. Hydrogenation may be accomplished on the raw material as such or in the presence of an inert diluent and solvent. On hydrogenation to the dihydro derivative two hydrogen atoms enter the ring in the 9,10 position as shown in the structural formula below:

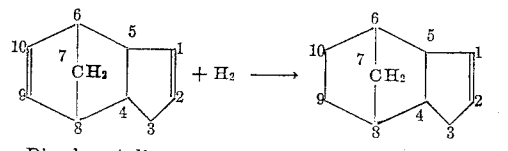

Dicyclopentadiene          Dihydrodicyclopentadiene to give 9–10 dihydro dicyclopentadiene or a mono- or dialkyl substituted dicyclopentadiene depending on whether pure dicyclopentadiene, a mono alkyl derivative, or a dialkyl dicyclopentadiene is used as the starting material. In the case of pure dicyclopentadiene the hydrogenation product is 9,10-dihydrodicyclopentadiene boiling at 177° to 178° C., at atmospheric pressure and melts at 50 to 50.5° C. On titration with bromine it absorbs bromine in an amount equal to 119 centigrams of bromine per gram. The mixed products of hydrogenation are liquid at ordinary temperature due to the mutual depression of the melting point.

For purposes of purification and elimination of any unhydrogenated dimers present in the crude dihydro product it is desirable but not necessary to distill the crude hydrogenation product at atmospheric or higher pressure so as to crack any unhydrogenated material to monomers which will boil between 40 and 75° C. and thus effect a separation of a pure dihydro dimer which is stable against cracking when distilled at atmospheric pressure.

The next stage in the preparation of these acids is to ester-oxonate the dihydro derivative to a carbalkoxy derivative of the tetrahydro dimer. This is effected by bringing into intimate mixture in a pressure resistant vessel capable of having its contents agitated, the dihydro derivative and an excess of a monohydric aliphatic alcohol in the presence of a cobalt catalyst while subjecting the contents of the vessel to a pressure of carbon monoxide at a pressure of preferably 3000 pounds per square inch gauge and a temperature of preferably 150° C.

The monohydric alcohol may be any aliphatic alcohol of from one to 12 carbon atoms, preferably 1 to 3 carbon atoms, and may be a normal primary alcohol, a branched primary alcohol, or a secondary alcohol. Examples of these alcohols are methanol, ethanol, isopropanol, isooctyl alcohol, dodecanol, etc. Since the primary purpose of the process is to recover the acids, it is of advantage to use the lowest molecular weight alcohol available and for this reason methanol is the preferred alcohol. The quantity of alcohol to be used in this reaction should be in excess of at least one molar equivalent of the dihydro material utilized in the reaction and is preferably present in a volume ratio of three parts of alcohol to one of the dihydro material. Under these conditions, a large part of the dihydro product is soluble in the alcohol but is not completely so. It has been found that complete solubility of the reactants in the alcohol phase is not necessary for successful operation of the reaction.

The cobalt catalyst used in this reaction may be present preferably in a concentration of between 0.1 and 5.0 weight percent as metal based on the dihydro product and is added to the reaction mixture either in the form of finely powdered cobalt metal or as cobalt carbonyl or as a cobalt salt of an organic acid readily soluble in at least one of the reaction materials such as the alcohol or dihydro material. For this purpose we use cobalt acetate, cobalt oleate, cobalt naphthenate or the cobalt salt of the novel acids forming the subject of this invention.

The reaction as set forth hereinbefore is run under the conditions set forth until at least one molar equivalent of carbon monoxide has been absorbed as indicated by pressure drop. On cooling and removing the reaction mixture from the pressure vessel, there is obtained a mixture comprising excess alcohol and the alkyl ester of the tetrahydrodicyclopentadiene carboxylic acid corresponding to the alcohol employed in the reaction. The point of attachment of the carboxyl group to the dicyclopentadiene ring is in the 1 or 2 position as shown in the structural formula below:

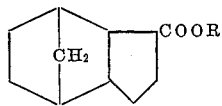 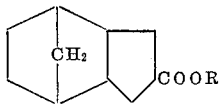

Ester of tetrahydrodicyclo-   Ester of tetrahydrodicyclo-
pentadiene 1: Carboxylic Acid   pentadiene 2: Carboxylic Acid In the case of pure dihydrodicyclopentadiene and methanol, the methyl ester may be readily separated from excess methanol by distillation. The methyl esters of the mixture of the 1- and 2-carboxylic acids boils at 97 to 99° C. at 2 mm. pressure and shows on analytical saponification, a saponification equivalent equal to 288 mgm. KOH/gm. With the conditions shown above a yield of 78 mole percent of the ester was obtained in a typical run based on the quantity of dihydro-alphadicyclopentadiene charged to the pressure vessel.

For recovering the corresponding acids these esters are then hydrolyzed by conventional methods such as the use of moderately dilute acids, such as 20% sulfuric acid used with or without the addition of an agent capable of depressing the interfacial tension such as mahogany sulfonates, Twitchell agents and the like. Or, the esters may be saponified in conventional manner by means of an excess of alkali. In the case of the former method the acids are obtained directly and are separated from the inorganic acid medium and purified by distillation. Where saponification is utilized for converting the ester to the acid, the acid is recovered from the saponification mixture by acidification with a mineral acid such as $H_2SO_4$, HCl and the like. The crude acids as obtained by either method are heavy viscous oils, nearly colorless, and are obtained in water-white state by distillation preferably under reduced pressure. The mixed acids obtained from pure dihydro-alphadicyclopentadiene boil at 131° to 132° C. at 1.5 mm., are water white in color, and nearly odorless. On standing, preferably at reduced temperature, the distilled acid crystallizes into a snow-white solid and on recrystallization of the solid acid from petroleum ether there is obtained a single acid melting at 102 to 103° C. having neutralization equivalent equal to 311 mgm. KOH/gm. Assignment of this solid acid to either the 1- or 2-position cannot be done at this time with certainty since oxidative degradation of either the 1 or 2 acid leads to the same end products.

The acids prepared by the process described above are novel and have many useful properties not hereinbefore shown by products of similar molecular weight. In performance characterstics they are best approached by the naphthenic acids isolated by alkali extraction from certain gas oils, but suffer from none of the drawbacks of these naphthenic acids in that the naphthenic acids are odoriferous to an undesirable degree, possess poor color initially, and become worse in storage and contain appreciable quantities of reactive sulfur compounds which interfere seriously with their extended use. These new acids readily form oil- and hydrocarbon-soluble salts of all of the heavy metals and accordingly are a suitable material for the production of paint driers such as the cobalt, lead and manganese salts, and in addition are suitable for the production of hydrocarbon-soluble copper and zinc salts which are of the utmost importance for the treatment of textiles, leather, and other material exposed to humid climatic conditions. The zinc salt in addition to use in fungicides, mildew preventatives and in paints is also suitable for incorporation into lubricant compositions where they act as inhibitors. It is within the province of this invention to utilize these acids for any uses where the naphthenic acids have hitherto been used, since a unique feature of the acids described in this invention is their ability to readily form oil and hydrocarbon-soluble derivatives of metal salts. The acids may further be esterified with other alcohols or glycols to form plasticizers, synthetic lubricants and the like. They are capable of rendering basic dyes, namely, those containing an amino group, which are normally water soluble in the form of their salts with inorganic acids, oil or hydrocarbon-soluble by reaction of the basic dye with this acid.

*Example 1.—α-Dicyclopentadiene*

Commercially available dicyclopentadiene which on analysis was found to contain (expressed as monomer) 75% of cyclopentadiene and 15% methyl cyclopentadiene was cracked in the liquid phase by distillation under a fractionating tower containing 30 plates. Using a reflux ratio of 15:1 rejected any methyl cyclopentadiene formed during the cracking process and substantially pure cyclopentadiene boiling at 40–40.5° C. at atmospheric pressure was taken overhead. The distillate was permitted to stand for three days at room temperature at which time the major portion of the monomer had dimerized to dicyclopentadiene. The undimerized diene was removed by application of vacuum at ordinary temperature resulting in solidification of the residue. It was distilled at reduced pressure, boiling at 170° C. extrapolated to atmospheric pressure and melted at 32–32.5° C.

*Example 2.—Dihydro α-dicyclopentadiene*

One hundred and thirty-two grams of α-dicyclopentadiene prepared in Example 1 was dissolved in 400 ml. of anhydrous ethanol contained in a hydrogenation bomb, 50 mgm. of $PtO_2$ catalyst added, the air exhausted from the system and replaced with hydrogen under 60 pounds per square inch guage pressure. The free space in the system was equal to 7.63 liters. The bomb was agitated at room temperature with immediate absorption of hydrogen. Hydrogenation to the dihydro α-dicyclopentadiene was complete in 20 minutes as indicated by a pressure drop of 47 pounds guage pressure.

The bomb was opened, the solution filtered to remove suspended platinum and the alcohol removed by distillation at atmospheric pressure. The crude product from four hydrogenation runs was combined and distilled at atmospheric pressure. Prior to taking any distillate overhead, the distillation was run under total reflux in order to crack any unhydrogenated dicyclopentadiene. The dihydro-alpha-dicyclopentadiene boiled at 177–178° C. @ 760 mm., weighed 502 grams, and solidified on cooling. It had a melting point of 50 to 50.5° C. and absorbed bromine by A. S. T. M. procedure D875–46T in an amount equivalent to 119.8 centigrams of bromine per gram. The theoretical equivalent for pure dihydro-alpha-dicyclopentadiene is 119.1 centigrams of bromine per gram.

*Example 3.—Methyl ester of tetrahydro α-dicyclopentadiene 1:(2) carboxylic acid*

Two hundred and one grams of the dihydro-alpha-dicyclopentadiene prepared in Example 2 was dissolved with the aid of heat in 667 ml. of anhydrous methanol and charged to a 2 liter stainless-steel high pressure autoclave. To the mixture was added 4.3 grams of finely powdered cobalt metal, equivalent to 0.5% by weight on the total reaction mixture. The air was displaced from the system and the autoclave charged with carbon monoxide to a pressure of 2400 pounds per square inch guage at 20° C. Agitation was started and the temperature raised over the course of one-half hour to 150° C. at which temperature the pressure in the system rose to 3500 pounds pressure per square inch guage. Absorption of the CO was steady at the working temperature of 150° C. and the system was repressured to 3500 pounds each time the pressure dropped to 3000 pounds pressure. Absorption of the CO was continued until approximately 120% of the theoretical quantity of CO had been absorbed as indicated by pressure drop. The autoclave was allowed to cool, the crude reaction product filtered from a small amount of unreacted cobalt metal and fractionally distilled. After removing the excess methanol the product boiled at 97–99° C. at 2 mm. pressure, was water white in color, had a mild fruity odor and weighed 244 grams. About 50 grams of material representing column holdup, which boiled at somewhat higher temperature probably due to superheating, was discarded. Analysis by saponification with standard alkali gave a saponification equivalent of 288 mgm. KOH per gram.

*Example 4.—Tetrahydro α-dicyclopentadiene, 1:(2) carboxylic acid*

One hundred and ninety-four grams of the methyl esters of tetrahydro alpha-dicyclopentadiene carboxylic acid prepared in Example 3 was added to 100 grams of KOH (85%) dissolved in 500 ml. of absolute alcohol. The solution was heated on a steam bath under reflux for 4 hours, the alcohol removed by distillation under reduced pressure and the residue dissolved in 500 ml. of cold water. The cold aqueous solution was extracted twice with 200 ml. portions of petroleum ether and then acidified with about 135 ml. of concentrated HCl. The carboxylic acid appeared as a milky precipitate which on standing collected as a pale yellow oil on the bottom of the flask. The mixture was extracted with ethyl ether, the ether extract washed free of mineral acid (Congo red indicator) and the ether removed on the steam bath. The residue was distilled under high vacuum yielding a water-white, viscous oil which boiled at 131–132° C. at 1.5 mm. Hg pressure and weighed 173 grams. Titration of a sample with standard alkali gave a neutralization equivalent of 0.1812 compared to a theoretical equivalent of 0.1802. After standing for some time the acid solidified to a white crystalline mass. Recrystallization from petroleum ether gave pure white crystals melting at 102–103° C. (Copper Bar). The acid as prepared appears to be a mixture of tetrahydro-alpha-dicyclopentadiene 1:carboxylic acid and tetrahydro alpha-dicyclopentadiene 2:carboxylic acid. Assignment of the acid melting at 102–103° C. to either the 1 or 2 position cannot be done with certainty at this time.

*Example 5.—Copper salt of tetrahydro-α-dicyclopentadiene 1:(2) carboxylic acid*

Eighteen grams (0.1 mol) of the acid prepared in Example 4 were dissolved in 100 ml. of 1.0 N NaOH, the pH adjusted to 6 and diluted to 250 ml. with water. The solution of the sodium salt was heated nearly to boiling and to it was added, with efficient agitation a solution of 8.5 grams of cupric chloride ($CuCl_2.2H_2O$) in 250 ml. of water heated nearly to the boiling point. The copper salt precipitated as pale bluish-green crystals. The precipitate was washed twice by decantation with 400 ml. of hot water and then collected on a Büchner funnel. After pressing dry it was allowed to stand in a desiccator over $CaCl_2$ for one week. Chemical analysis showed a copper content of 14.3 weight percent copper against a theoretical copper content of 15.05. The copper salt is soluble in the cold in most of the common organic solvents such as ether, benzene, hexane, petroleum spirits, etc.

A solution of the copper salt in a petroleum naphtha boiling between 240 and 290° F. was made so as to contain 4% of Cu in the solution and then padded into cotton duck in an amount equal to a 50 weight percent take up. On drying the cloth showed on analysis a take up of 2 weight percent of copper. It was stable against leaching when washed with water and when subjected to soil burial tests showed no tendering of the fabric in the time required to cause nearly complete disintegration of the untreated cloth.

*Example 6.—Cobalt salt of tetrahydro α-dicyclopentadiene 1:(2) carboxylic acid*

The cobalt salt of the distilled acid prepared in Example 4 was made in the same manner as the copper salt in Example 5 except that 11.9 grams of cobaltous chloride ($CoCl_2.6H_2O$) was substituted for the copper chloride. The precipitated cobalt salt which was a pale pink in color was taken up in petroleum naphtha after washing and filtration, water held in the filter cake separated from the naphtha solution, and the solution dehydrated by distillation under a Dean-Stark water trap. The clear solution of the cobalt salt which was deep purple in color was analyzed for cobalt content and adjusted to a 6 weight percent solution of the metal.

*Example 7.—Manganese salt or tetrahydro α-dicyclopentadiene, 1:(2) carboxylic acid*

The manganese salt of the distilled acid prepared in Example 4 was prepared in the same manner as the cobalt salt in Example 6 except that 8.5 grams of manganous sulfate (MnSO₄.H₂O) was used instead of the cobalt. The precipitated manganous salt was perfectly white in color and when dissolved in cold hexane gave a colorless solution. On heating a solution of the manganous salt in petroleum naphtha in the presence of air the color gradually darkened (probably due to a change in valence state of the manganese) to a reddish-brown color. The solution in the naphtha was adjusted to contain 6 weight percent of manganese.

*Example 8.—Drying tests on cobalt and manganese salts*

A series of tests were run on the time required for uniform films of linseed oil and a synthetic drying oil made by the polymerization of butadiene to set to tack-free condition. For purposes of comparison two driers available commercially, Nuodex 6% cobalt and Nuodex 6% manganese were used in companion experiments. The table below gives the drying times found:

(a) SYNTHETIC DRYING OIL

| Drier | Conc. of Metal, Wt. Percent | | Drying Time to Tack Free State, hours |
|---|---|---|---|
| | Mn | Co | |
| Nuodex | .04 | | 30. |
| Do | | .04 | >8, <22. |
| Do | .02 | .02 | >8, <22. |
| Do | .04 | .04 | >8, <22. |
| Ex. 7 | .04 | | >8, <22. |
| Ex. 6 | | .04 | >8, <22. |
| Exs. 6 and 7 | .02 | .02 | >8, <22. |
| Do | .04 | .04 | >8, <22. |

(b) LINSEED OIL

| Drier | Conc. of Metal, Wt. Percent | | Drying Time to Tack Free State |
|---|---|---|---|
| | Mn | Co | |
| Nuodex | .04 | | Not tack free in 15 days. |
| Do | | .04 | 15 days. |
| Do | .02 | .02 | Do. |
| Do | .04 | .04 | Do. |
| Ex. 7 | .04 | | 4 days. |
| Ex. 6 | | .04 | 50 hours. |
| Exs. 7 and 6 | .02 | .02 | Do. |
| Do | .04 | .04 | Do. |

The above data indicate that for fast drying oils such as the synthetic drying oil, both the Nuodex catalyst and the experimental salts are equivalent. For slow drying oils such as linseed oil, the metal salts of the acids forming the subject matter of this invention are superior.

*Example 9.—Alkyl tetrahydrodicyclopentadiene carboxylic acids*

One liter (965 grams) of a commercial grade of dicyclopentadiene found to contain on analysis 75% cyclopentadiene and 15% methyl cyclopentadiene (expressed as monomer but combined as copolymers) was charged to a 2-liter hydrogenation bomb together with approximately 50 grams of Raney nickel hydrogenation catalyst. Hydrogen was admitted to the system to 1800 pounds per square inch guage and agitation started. Absorption of hydrogen began immediately with a simultaneous rise in temperature which gradually leveled out at 85° C. The system was repressured each time the pressure dropped to 1000 pounds until a total pressure drop of 2900 pounds had taken place. The catalyst was removed by filtration from the crude dihydrodiene and the filtrate subjected to fractionation at atmospheric pressure. After removing some low boiling material, there was obtained a water-white product boiling at 177–184° C. which weighed 824 grams. In contradistinction to pure dihydro-alpha dicyclopentadiene which is a solid at ordinary temperatures, the dihydro methyl dicyclopentadiene remains liquid. It had a bromine number by A. S. T. M. procedure D875–46T equivalent to 117 centigrams of bromine per gram.

When subjected to ester-oxonation in the manner described in Example 3 a water-white liquid acid was obtained on saponification of the ester. The metal salts of the acid had substantially the same solubility characteristics as the salts made from pure tetrahydrodicyclopentadiene 1:(2) carboxylic acid.

*Example 10.—Dialkyl tetrahydro dicyclopentadiene carboxylic acid*

A high boiling bottoms obtained from the liquid phase cracking of commercial dicyclopentadiene was cracked in the vapor phase and a fraction rich in methyl cyclopentadiene boiling at 73° C. was continuously removed as a side stream during fractionation of the cracked products. The crude methyl cyclopentadiene was allowed to dimerize at room temperature and the dimer purified by distillation at reduced pressure. It boiled at 207–210° C. extrapolated to atmospheric pressure. Analysis showed the following composition (expressed as monomer):

| | Weight percent |
|---|---|
| Methyl cyclopentadiene | 93.2 |
| Cyclopentadiene | 2.6 |
| C₇ cyclodiene | 2.8 |
| Acyclic C₅ dienes | 1.4 |

One hundred and fifty grams of the above dimethyl dicyclopentadiene was charged to a hydrogenation bomb with sufficient absolute ethanol to make a total volume of 500 ml. and 100 mgm. of PtO₂ hydrogenation catalyst added. Hydrogenation was started at room temperature and continued for a pressure drop of 46 pounds per square inch gage from an initial 60 pounds pressure. The catalyst was removed by filtration, alcohol removed by atmospheric distillation and the product fractionally distilled at atmospheric pressure so as to crack and remove as monomer any unhydrogenated dimer. Distillate boiled at 215–218° C. weighed 140 gms. and on redistillation under reduced pressure boiled at 48–49° C. at 2 mm. pressure.

When subjected to ester-oxonation in the manner described in Example 3 a water-white liquid acid was obtained on saponification of the ester. The metal salts of the acid had substantially the same solubility characteristics as the salts made from pure tetrahydrodicyclopentadiene 1:(2) carboxylic acid.

What is claimed is:

1. A process for the production of tetrahydro-alpha-dicyclopentadiene carboxylic acids which comprises reacting a material selected from the group consisting of dicyclopentadiene and alkyl derivatives thereof with hydrogen to form a hydrogenated material selected from the group consisting of dihydrodicyclopentadiene, dihydroalkyldicyclopentadiene and dihydrodialkyldicyclopentadiene, reacting the hydrogenated material with CO and a monohydric aliphatic alcohol in the presence of a cobalt-containing catalyst at a temperature of 100–200° C. and at a pressure of 2500–4000 p. s. i. g. to form a carbalkoxy derivative of the hydrogenated material and converting the carbalkoxy derivative to a carboxylic acid selected from the group consisting of tetrahydrodicyclopentadiene carboxylic acids, alkyl tetrahydrodicyclopentadiene carboxylic acids and dialkyl tetrahydrodicyclopentadiene carboxylic acids.

2. A process for the production of tetrahydrodicyclopentadiene:1(2) carboxylic acid which comprises reacting dicyclopentadiene with hydrogen to form dihydrodicyclopentadiene, reacting dihydrodicyclopentadiene with CO and methyl alcohol in the presence of a hydrocarbon-soluble salt of cobalt at a temperature of about 150° C. and a pressure of 3000 to 3500 p. s. i. g. to form carbo-methoxy tetrahydrodicyclopentadiene, and converting the carbo-methoxy derivative to tetrahydrodicyclopentadiene:1(2) carboxylic acid.

3. A process according to claim 2 in which the hydrocarbon-soluble salt of cobalt is cobalt oleate.

4. A process according to claim 2 in which the hydrocarbon-soluble salt of cobalt is the cobalt salt of tetrahydrodicyclopentadiene:1(2) carboxylic acid.

5. Tetrahydro - alpha - dicyclopentadiene:1(2) carboxylic acid.

6. Tetrahydro - alkyl - dicyclopentadiene:1(2) carboxylic acid.

7. Alkyl esters of tetrahydro-alpha-dicyclopentadiene:1(2) carboxylic acid, wherein the ester group contains an alkyl radical of 1 to 12 carbon atoms.

8. Alkyl esters of tetrahydro-alkyl-dicyclopentadiene:1(2) carboxylic acid wherein the ester group contains an alkyl radical of 1 to 12 carbon atoms.

9. Salts of tetrahydro-alpha-dicyclopentadiene:1(2) carboxylic acid.

10. Salts of tetrahydro-alpha-dicyclopentadiene:1(2) carboxylic acid, wherein the metal of the salt is one selected from the group consisting of copper, manganese, cobalt, zinc, and lead.

11. Salts of tetrahydro - alkyl - dicyclopentadiene:1(2) carboxylic acid.

12. Salts of tetrahydro-alkyl-dicyclopentadiene:1(2) carboxylic acid, wherein the metal of the salt is one selected from the group consisting of copper, manganese, cobalt, zinc, and lead.

13. Tetrahydro - alpha-dicyclopentadiene carboxy compounds having the formula:

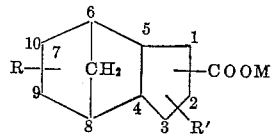

wherein the COOM group is attached to a carbon atom selected from the 1 and 2 carbon atoms, wherein R and R' represent substituents selected from the group consisting of hydrogen and alkyl groups, and wherein M is a substituent selected from the group consisting of alkyl groups, hydrogen and an equivalent weight of metal.

References Cited in the file of this patent

UNITED STATES PATENTS

| Number | Name | Date |
|---|---|---|
| 2,448,368 | Gresham et al. | Aug. 31, 1948 |
| 2,514,533 | Bloch | July 11, 1950 |

OTHER REFERENCES

Elsenier's Encyclopedia of Organic Chemistry, vol. 13, pages 1030–1031.